United States Patent Office 3,190,854
Patented June 22, 1965

3,190,854
ORGANOMETALLIC POLYMERS OF DIKETONES
John D. Behun, Southgate, Mich., assignor to Wyandotte Chemicals Corporation, Wyandotte, Mich., a corporation of Michigan
No Drawing. Original application Jan. 16, 1959, Ser. No. 787,110. Divided and this application Oct. 12, 1961, Ser. No. 144,570
16 Claims. (Cl. 260—63)

This invention relates to new organometallic polymers and methods for preparing the same. More particularly, this invention relates to chelate polymers derived by reacting divalent metal salts having a primary valence of 2 and a coordination number of 4 with a diketone prepared by reacting an alkali metal methylpyrazine with certain diesters.

This application is a division of my copending application Serial No. 787,110, filed January 16, 1959, and now abandoned.

The polymers of this invention are characterized by their stability at high temperatures. They do not melt below 300° C. and the application of heat for extended periods does not induce chemical decomposition of the polymer at temperatures below 300° C. They can be shaped into molded articles, fibers, and films by standard molding, spinning and casting techniques. The exceptional thermal stability of the polymers of this invention, as opposed to polymers consisting of aliphatic groups, may be attributed to the aromatic heterocyclic nuclei therein. In view of the fact that the polymers of the invention have high temperature stability, they are particularly adapted for being molded and shaped into articles at high temperatures. In addition, these polymers are also suitable for use in military applications where high temperature stability is desired.

An object of this invention, therefore, is to provide a polymer having high temperature stability. Another object of this invention is to provide heat-stable chelate polymers. A further object of this invention is to provide a process for synthesizing heat-stable chelate polymers by reacting a diketone with a compound of a metal having a primary valence of 2 and a coordination number of 4. Additional objects will become apparent from the following description of the invention.

In accordance with the present invention, a process is provided for preparing organometallic polymers having high temperature stability, which comprises (1) dissolving a diketone corresponding to the following formula:

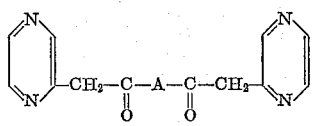

wherein A is a divalent hydrocarbon radical selected from the group consisting of alkylene radicals having from about 4 to 12 carbon atoms and nonvicinal arylene radicals having from about 6 to 12 carbon atoms in a solvent therefor, (2) adding a divalent metal salt in which the metal atom has a primary valence of 2 and a coordination number of 4 thereto at a temperature from about 20° C. to about the reflux temperature of said solvent, and (3) continuing the reaction until an organometallic polymer is formed, said polymer containing recurring polymeric units as shown:

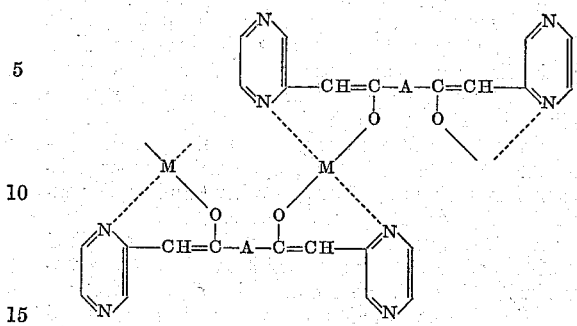

wherein M is the divalent metal of the divalent metal salt previously defined and A is the divalent hydrocarbon radical previously defined.

PREPARATION OF DIKETONE

The diketones which can be employed in order to prepare the organometallic polymers of the invention correspond to the following formula:

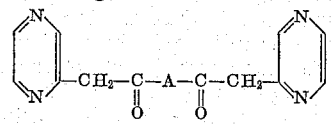

wherein A is a divalent hydrocarbon radical selected from the group consisting of alkylene radicals having about 4 to 12 carbon atoms and nonvicinal arylene radicals having about 6 to 12 carbon atoms.

The diketones are prepared by slowly adding a diester according to the formula:

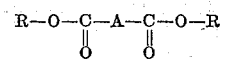

wherein A is a divalent hydrocarbon radical corresponding to A in the above-noted diketone formula and R is an alkyl radical containing from about 1 to 2 carbon atoms to an alkali metal methylpyrazine in a suitable solvent therefor at a temperature limited by the reflux temperature of said solvent and separating the diketone therefrom.

The diesters which can be employed to prepare the intermediate diketones of the invention can be looked upon as being derived from either aliphatic or aromatic divalent hydrocarbon radicals. It will be noted that the aromatic divalent hydrocarbon radicals are described hereinabove as being nonvicinal arylene radicals. The term "nonvicinal" is used to exclude the orthoisomeric derivative of the arylene radicals. Thus it should be understood that only the para- and meta-derivatives of arylene radicals are included in the scope of this invention. Since it is well known that hydrocarbon radicals joined by an ether linkage act like simple hydrocarbons in most chemical reactions, for the purposes of this invention, therefore, such compounds are construed to be the equivalent of the aromatic or aliphatic radicals hereinafter defined.

Suitable examples of aliphatic A groups in the above diester formula include tetramethylene, pentamethylene, hexamethylene, octamethylene, decamethylene, dodecamethylene and hydrocarbon substituted radicals of this type. Aromatic radicals suitable as A groups include meta- and para-phenylene, meta- and para-biphenylene, meta- and para-oxydiphenylene, meta- and para-xylylene, naphthylene, and the like.

Those diesters which are particularly advantageous for preparing the diketone intermediates of the invention include dimethyladipate, diethyladipate, dimethylpimelate, diethylpimelate, dimethylsuberate, dimethyl terephthalate, 4,4'-oxy-bis(methylbenzoate), dimethyl isophthalate and 3,3'-oxy-bis(methylbenzoate).

The alkali metal methylpyrazines which are reacted with the aforementioned diesters in order to prepare the diketones include, for example, sodium methylpyrazine, potassium methylpyrazine and lithium methylpyrazine. The alkali metal methylpyrazines can be prepared via the corresponding alkali amide by dissolving an alkali metal in liquid ammonia containing a catalytic agent such as ferric nitrate and subsequently adding methylpyrazine thereto. Although liquid ammonia is an especially good solvent for carrying out the reaction between the alkali metal and methylpyrazine, other suitable solvents, such as pyridine and other t-amines, for example dimethyl aniline, can also be employed.

In order to prepare the diketone, a diester, as described above, is added to the ammonia solution of sodium methylpyrazine. Although the molar ratios of the reactants participating in the reaction are not critical and good yields are obtained at approximately equal molar ratios, nevertheless, improved yields are obtained when the alkali metal methylpyrazine is employed at a molar ratio in excess of 1:1. However, optimum yields of the diketone are obtained when the reactants are present in the molar ratio of about 4 mols of alkali metal methylpyrazine to about 1 mol of diester. The reaction is carried out under agitation and can be quenched by adding ammonium chloride thereto. The diketone can be separated from the mixture by conventional techniques such as replacing the ammonia with ether and hydrolyzing with water so as to precipitate the diketone. Following the method of the invention, the diketones are obtained in yields up to about 90%.

PREPARATION OF ORGANOMETALLIC POLYMER

The organometallic polymer of the invention is a polymer having a linear chain of a plurality or recurring spirane-type symmetrical units represented by the following general formula:

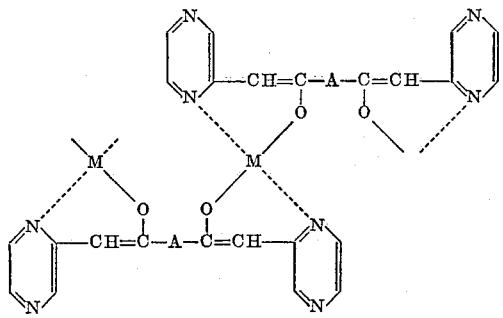

where A is a divalent hydrocarbon radical selected from the group consisting of alkylene radicals having from about 4 to 12 carbon atoms and nonvicinal arylene radicals having about 6 to 12 carbon atoms and M is a divalent metal atom having a primary valence of 2 and a coordination number of 4 and is prepared by (1) dissolving the diketone previously defined in a suitable solvent therefor, (2) adding a divalent metal salt thereto at a temperature from about 20° C. to about the reflux temperature of said solvent, (3) continuing the reaction until the organometallic polymer is formed, and (4) separating the polymer from the reaction mixture.

The diketone, prepared by reacting a diester with an alkali metal methylpyrazine, is dissolved in a suitable solvent. It has been found that pyridine at a temperature in the range of about 50-90° C. is an especially good solvent for the diketone. However, other solvents, such as dimethylsulfoxide, can also be employed to dissolve the diketone.

The diketone intermediates of the invention form highly stable neutral coordinate or inner complex compounds with metals having a coordination number which is twice a principal valence. For the preparation of linear, chelate or organometallic polymeric structures from these diketones, metals having a principal valence of 2 and a coordinate number of 4 are required. The metals which satisfy this latter requirement, i.e., which have a primary valence of 2 and a coordination number of 4, include beryllium, copper, nickel, zinc, cobalt, iron, palladium, manganese, calcium, strontium, barium, cadmium, and the like. In accordance with this invention, these metals are used in the form of compounds, such as the metal salts of organic and inorganic acids. Examples of suitable salts which can be employed to prepare the chelate polymers of the invention include copper acetate, beryllium acetate, barium cyanide, cobalt nitrate and zinc nitrate, as well as mixtures thereof.

The organometallic polymers of the invention are prepared simply by adding a suitable metal salt to a warm solution of the aforementioned diketone. Although the molar ratio of the reactants is not critical, good results are obtained when the molar ratio of the metal salt to the diketone is in the range of about 4:5 to about 5:5. However, it is preferred for economic reasons to employ the reactants at approximately equal or 1:1 mol ratio. The product of the reaction between the diketone and metal salt is a chelate polymer having the following molecular configuration:

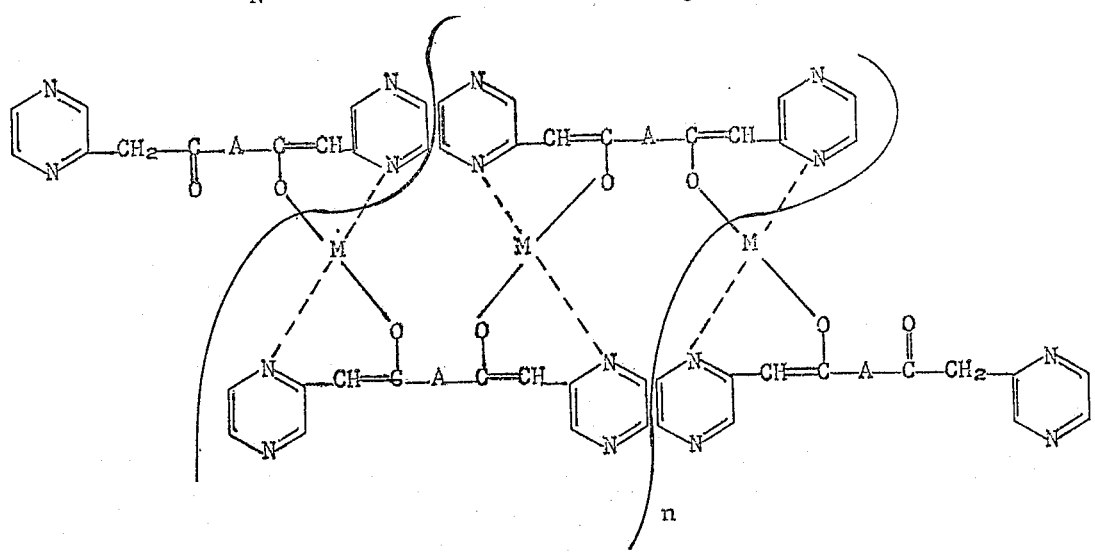

wherein $n$ has a value of at least about 4.

Since the metal atom in the polymer chain is tetrahedral, the chain, therefore, contains a plurality of recurring spirane-type symmetrical units in which the planar configurations of the adjoining rings are perpendicular to one another. The diketone has two functional groups separated by an appropriate divalent hydrocarbon. The enol form of each of the functional groups reacts as an acid and forms a salt with the metal. The metal atom having 2 ionic valences combines with 2 enol groups to form the salt. The nitrogen atom in the pyrazine ring, in the vicinity of the metal atom, also becomes attached to the metal atom through coordinate covalences to form an exceedingly stable union. Accordingly, the recurring units of the polymers of this invention are represented by the following formula wherein M is a metal having a primary valence of 2 and a coordination number of 4 and A is a divalent hydrocarbon having a value as previously defined:

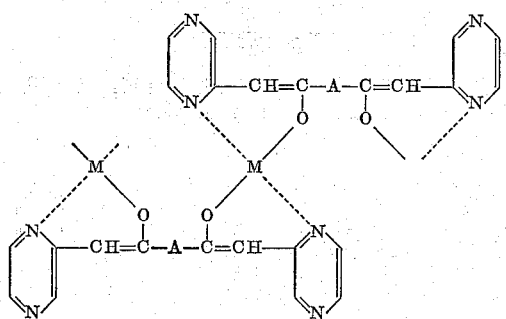

Preferably, the process of this invention is carried out at atmospheric pressure; however, pressures below or above atmospheric can be used. For example, it may be desirable when using ammonia as a solvent to work with a closed system.

The following examples further illustrate the new chelate polymers of this invention and methods for preparing the same, as well as the ketone intermediates useful in preparing the organo-metallic polymers described herein.

*Example I*

(A) Preparation of p-phenylene-bis-pyrazylmethyldiketone having the following formula:

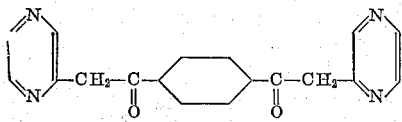

About 150 milliliters of liquid ammonia and a small amount of ferric nitrate catalyst were added to a three-neck round bottom 500 milliliter flask equipped with a Dry Ice condenser, stirrer and delivery tube. To the liquid ammonia contained in this flask, there was added 4.6 grams (0.2 mol) of sodium. 18.8 grams (0.2 mol) of methylpyrazine were added to this mixture over a ten-minute period. There was thus formed in the flask sodium methylpyrazine. The resulting mixture was agitated for an additional thirty minutes. 9.7 grams (0.05 mol) of dimethyl terephthalate, in powder form, were then added over a fifteen-minute time interval to the sodium methylpyrazine solution and, when the addition of the diester was completed, the resulting mixture was agitated for an additional hour. At the end of this period the reaction was quenched by adding 25 grams of ammonium chloride thereto. 200 milliliters of diethylether were subsequently added to the reaction mixture and the ammonia was allowed to distill off. The ether solution obtained by this interchange of solvents was poured onto 100 grams of ice and a yellow solid precipitated therefrom. The yellow solid was washed with water and dried. There was obtained 14.0 grams of p-phenylene-bis-pyrazylmethyldiketone having a melting point in the range of 225–230° C. The yield, therefore, was 88% of the desired diketone. The diketone was purified by recrystallizing the same from pyridine and the recrystallized composition had a melting point of 232–233° C.

The carbon, hydrogen, nitrogen and oxygen analysis for this diketone is set forth below:

| Analysis | Calculated, percent | Actually Found,[1] percent |
|---|---|---|
| $C_{18}$ | 67.91 | 68.17 |
| $H_{14}$ | 4.43 | 4.47 |
| $N_4$ | 17.60 | 17.28 |
| $O_2$ | (Balance) | (Balance) |

[1] Conventional microanalytical techniques used.

An oxime derivative of the diketone was prepared by refluxing an aliquot of the aforementioned diketone with hydroxylamine hydrochloride and sodium acetate in an ethanol-water solution until all the solid had dissolved and the yellow color had disappeared. Upon cooling the oxime derivative of the diketone crystallized out from the solution and was recrystallized from ethanol to give a composition which had a melting point of 224–225° C. The analysis of this derivative of the diketone gave the following results:

| Analysis | Calculated, percent | Actually Found, percent |
|---|---|---|
| $C_{18}$ | 62.06 | 62.08 |
| $H_{14}$ | 4.63 | 4.75 |
| $N_6$ | 24.13 | 23.89 |
| $O_2$ | (Balance) | (Balance) |

(B) Preparation of a copper chelate from p-phenylene-bis-pyrazylmethyldiketone:

1.0 gram of the diketone prepared in accordance with the procedure set forth in step (A) was dissolved in approximately 200 milliliters of pyridine maintained at a temperature between 50–90° C. 10 milliliters of water were added to the warm pyridine solution and this was followed by 0.6 gram of copper acetate in aqueous solution. There was obtained a yellow-brown precipitate which was separated from the reaction mixture. The precipitate had a dry weight of 0.9 gram. It was observed that the precipitated polymer did not melt below 300° C.

The elemental analysis of the organometallic polymer obtained from this reaction is as follows:

| Element | Calculated, percent | Actually Found, percent |
|---|---|---|
| C | 57.84 | 57.09 |
| H | 3.29 | 3.56 |
| N | 14.99 | 14.07 |
| Cu | 15.31 | 14.97 |

This analysis corresponds to an organometallic polymer having the following formula:

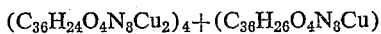

and the following molecular configuration:

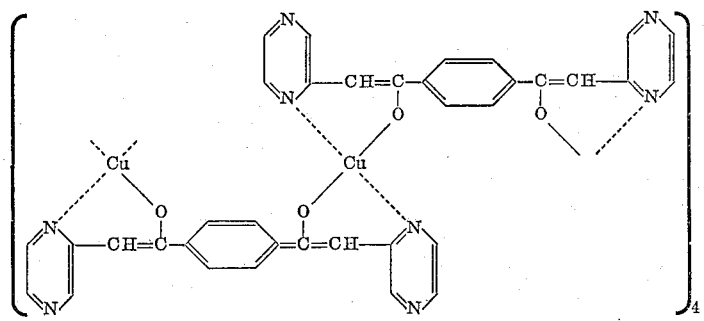

(C) Preparation of a cobalt chelate from p-phenylene-bis-pyrazylmethyldiketone:

1.0 gram of p-phenylene-bis-pyrazylmethyldiketone prepared in accordance with the procedure set forth in step (A) was dissolved in approximately 200 milliliters of pyridine maintained at a temperature between 50–90° C. 10 milliliters of water were added to the warm pyridine solution and this was followed by a small amount of cobalt nitrate in aqueous solution. There was obtained a red-brown precipitate consisting of the cobalt chelate of p-phenylene-bis-pyrazylmethyldiketone which was separated from the reaction mixture. The precipitate had a dry weight of about 1.0 gram and it was observed that the precipitated polymer did not melt below 300° C.

*Example II*

(A) Preparation of m-phenylene-bis-pyrazylmethyldiketone having the following formula:

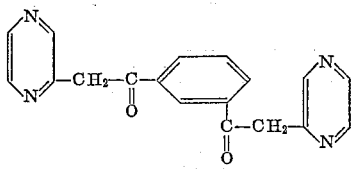

1.5 grams of sodium were added to about 100 milliliters of anhydrous ammonia contained in a three-neck round bottom flask equipped with a Dry Ice condenser, stirrer and delivery tube. 8.1 grams of methylpyrazine were added to the flask and the resulting red-colored composition was stirred for one-half hour. There was formed in the flask sodium methylpyrazine. 4.2 grams of dimethyl isophthalate dissolved in about 50 milliliters of ether were added to the flask over a twenty-minute time interval and, when the addition of the diester was completed, the contents of the flask were agitated for an additional two hours. At the end of this period the reaction was quenched by adding ammonium chloride thereto. 150 milliliters of diethylether were subsequently added to the reaction mixture and the ammonia was allowed to distill off. The ether solution obtained by this interchange of solvents was poured onto 200 milliliters of water and acidified with hydrochloric acid. The resultant solid product that was filtered off was m-phenylene-bis-pyrazylmethyldiketone.

(B) About 1.0 gram of m-phenylene-bis-pyrazylmethyldiketone was added to a flask containing warm pyridine. 10 milliliters of water were added thereto and this was followed by the addition of a small amount of an aqueous solution of copper acetate. There was obtained a brown-green precipitate of the copper chelate of m-phenylene-bis-pyrazylmethyldiketone and it was observed that this chelate did not melt below 300° C.

*Example III*

(A) Preparation of n-tetramethylene-bis-pyrazylmethyldiketone having the following formula:

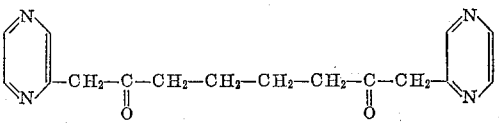

4.6 grams of sodium were added to about 150 milliliters of anhydrous liquid ammonia contained in a three-neck round bottom 500 milliliter flask equipped with a Dry Ice condenser, stirrer and delivery tube. 18.8 grams of methylpyrazine were added to the flask and the resulting red-colored composition was stirred for one-half hour. There was thus formed in the flask sodium methylpyrazine. 10.1 grams of dimethyladipate dissolved in about 10 milliliters of ether were added to the flask over a fifteen-minute time interval and, when the addition of the diester was completed, the contents in the flask were agitated for an additional hour. At the end of this period the reaction was quenched by adding ammonium chloride thereto. 200 milliliters of diethylether were subsequently added to the reaction mixture and the ammonia was allowed to distill off. The ether solution obtained by this interchange of solvents was poured onto 100 grams of ice acidified with hydrochloric acid. The nonaqueous phase was extracted with diethylether and the aqueous phase was made basic with caustic soda and soda ash and then extracted with trichloromethane and dried with anhydrous magnesium sulfate. The solvents and the unreacted components were distilled from the two extracts. There was obtained n-tetramethylene-bis-pyrazylmethyldiketone.

(B) About 1.0 gram of n-tetramethylene-bis-pyrazylmethyldiketone was added to a flask containing warm pyridine. 10 milliliters of water were added thereto and this was followed by the addition of a small amount of an aqueous solution of copper acetate. There was obtained a brown-green precipitate of the copper chelate of n-tetramethylene-bis-pyrazylmethyldiketone and it was observed that this chelate did not melt below 300° C.

Thus, the objects of this invention have been accomplished, namely, heat-stable chelate polymers have been provided which are derived by reacting divalent metal salts having a primary valence of 2 and a coordination number of 4 with a diketone prepared by reacting an alkali metal methylpyrazine with certain diesters previously defined.

I claim:
1. A process for preparing organometallic polymers having high temperature stability, which comprises (1) dissolving a diketone of the following formula:

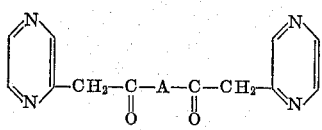

wherein A is a divalent hydrocarbon radical selected from the group consisting of alkylene radicals having from about 4 to 12 carbon atoms, meta-phenylene, para-phenylene, meta-biphenylene, para-biphenylene, meta-oxydiphenylene, para-oxydiphenylene, meta-xylene, para-xylene and naphthylene in a solvent therefor, (2) adding a divalent metal salt in which the metal atom is selected from the group consisting of beryllium, copper, nickel, zinc, cobalt, iron palladium manganese calcium, strontium, barium and cadmium thereto at a temperature from about 20° C. to about the reflux temperature of said solvent until an organometallic polymer is formed, said polymer containing recurring polymeric units as shown:

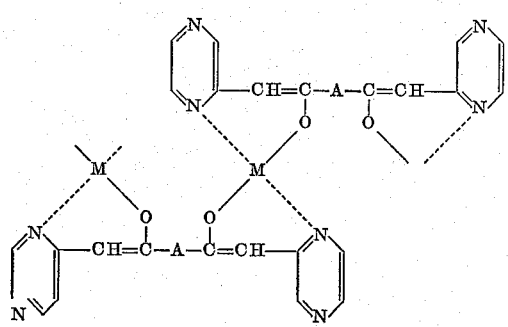

where M is the divalent metal atom of the divalent metal salt previously defined and A is the divalent hydrocarbon radical previously defined.

2. A process in accordance with claim 1 wherein the diketone is p-phenylene-bis-pyrazylmethyldiketone.

3. A process in accordance with claim 1 wherein the diketone is n-tetramethylene-bis-pyrazylmethyldiketone.

4. A process in accordance with claim 1 wherein the molar ratio of the divalent metal salt to the diketone is about 1:1.

5. A process in accordance with claim 1 wherein the solvent for said diketone is pyridine.

6. A process for preparing organometallic polymers having high temperature stability, which comprises (1) dissolving a diketone of the formula:

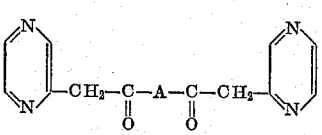

wherein A is a divalent hydrocarbon radical selected from the group consisting of alkylene radicals having from about 4 to 12 carbon atoms, meta-phenylene, para-phenylene, meta-biphenylene, para-biphenylene, meta-oxydiphenylene, para-oxydiphenylene, meta-xylene, para-xylene and naphthylene in pyridine, said pyridine being at a temperature in the range of about 50° C. to 90° C., (2) adding a divalent metal salt in which the metal atom is selected from the group consisting of beryllium, copper, nickel, zinc, cobalt, iron, palladium, manganese, calcium, strontium, barium and cadmium thereto until an organometallic polymer is formed, said polymer containing recurring polymeric units as shown:

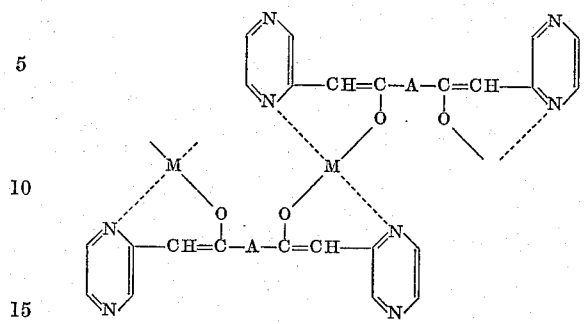

wherein M is the divalent metal atom of the divalent metal salt previously defined and A is the divalent hydrocarbon radical previously defined.

7. A process in accordance with claim 6 wherein the diketone is p-phenylene-bis-pyrazylmethyldiketone.

8. A process in accordance with claim 6 wherein the diketone is n-tetramethylene-bis-pyrazylmethyldiketone.

9. The process of claim 7 wherein the diketone is m-phenylene-bis-pyrazylmethyldiketone.

10. A process in accordance with claim 6 wherein the diketone is 4,4' - oxybiphenylene - bis-pyrazylmethyldiketone.

11. A process in accordance with claim 6 wherein the diketone is 3,3' - oxybiphenylene - bis-pyrazylmethyldiketone.

12. An organometallic polymer having a linear chain of a plurality of recurring spirane-type symmetrical units represented by the following formula:

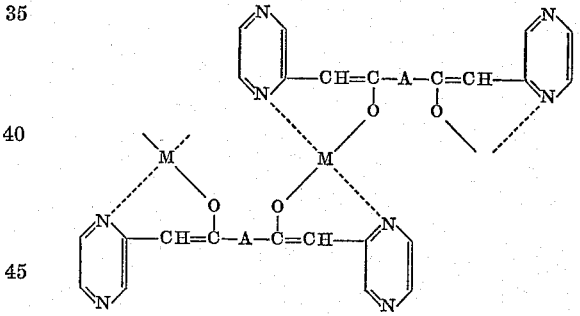

wherein A is a divalent hydrocarbon radical selected from the group consisting of alkylene radicals having from 4 to 12 carbon atoms, meta-phenylene, para-phenylene, meta-biphenylene, para-biphenylene, meta-oxydiphenylene, para-oxydiphenylene, meta-xylene, para-xylene and naphthylene and M is a divalent metal atom having a primary valence of 2 and a coordination number of 4 and selected from the group consisting of beryllium, copper, nickel, zinc, cobalt, iron, palladium, manganese, calcium, strontium, barium and cadmium.

13. An organometallic polymer in accordance with claim 12 wherein A is the tetramethylene radical.

14. An organometallic polymer in accordance with claim 12 wherein A is the meta-phenylene radical.

15. An organometallic polymer in accordance with claim 12 wherein A is the para-phenylene radical.

16. An organometallic polymer in accordance with claim 12 wherein the metal atom designated by M is copper.

References Cited by the Examiner
UNITED STATES PATENTS
3,068,231   12/62   Behun _____ 260—63

LEON J. BERCOVITZ, *Primary Examiner.*
H. N. BURSTEIN, *Examiner.*